US006685051B2

(12) United States Patent
Zangari et al.

(10) Patent No.: US 6,685,051 B2
(45) Date of Patent: Feb. 3, 2004

(54) COOLING APPARATUS AND RELEASING SYSTEM FOR BEVERAGES IN CONTAINERS

(75) Inventors: Jony Marcelo Zangari, Londrina-Parana (BR); Andre Elio Rohloff, Londrina-PR (BR); Graziela Bertoni, Londrina-PR (BR); Marco Antonio Tadeu Ribeiro, Cambe-PR (BR); Eduarde Nicolai, Londrina-Parana (BR)

(73) Assignee: Hussman Corporation, Bridgeton, MO (US)

( * ) Notice: Subject to any disclaimer, the term of this patent is extended or adjusted under 35 U.S.C. 154(b) by 94 days.

(21) Appl. No.: 10/152,313

(22) Filed: May 21, 2002

(65) Prior Publication Data

US 2003/0218023 A1 Nov. 27, 2003

(51) Int. Cl.$^{7}$ .............................................. B65G 59/00
(52) U.S. Cl. ......................................... 221/67; 221/129
(58) Field of Search .......................... 221/92, 129, 130, 221/131, 67, 150 R, 155, 191, 298; 62/378, 440, 441; 312/36

(56) References Cited

U.S. PATENT DOCUMENTS

| | | | |
|---|---|---|---|
| 1,483,777 | A | 2/1924 | Callahan |
| 2,376,960 | A | 5/1945 | Clem |
| 3,348,733 | A | 10/1967 | Johnson |
| 3,464,589 | A | 9/1969 | Oden |
| 3,613,945 | A | 10/1971 | Rockola et al. |
| 4,289,254 | A | 9/1981 | Spring |
| 4,368,625 | A | 1/1983 | Platt |
| 4,577,780 | A | 3/1986 | Holland et al. |
| 4,676,074 | A | 6/1987 | Morgan, Jr. et al. |
| 4,779,760 | A | 10/1988 | Wittern et al. |
| 5,199,598 | A | 4/1993 | Sampson |
| 5,366,285 | A | 11/1994 | Borgen et al. |
| 5,392,953 | A | 2/1995 | Maldanis et al. |
| 6,240,739 | B1 | 6/2001 | Hayes |
| 6,266,966 | B1 | 7/2001 | Fernandez et al. |

FOREIGN PATENT DOCUMENTS

| | | |
|---|---|---|
| BR | 8805373 A | 5/1990 |
| BR | 9303029-0 A | 3/1995 |
| EP | 0 164 761 | 12/1985 |
| GB | 1094769 | 12/1967 |
| GB | 1235900 | 6/1971 |
| GB | 2226549 A | 4/1990 |
| WO | 88/05892 | 8/1988 |
| WO | WO91/06077 | 5/1991 |
| WO | WO98/07356 | 2/1998 |

*Primary Examiner*—Kenneth W. Noland
(74) *Attorney, Agent, or Firm*—Michael Best & Friedrich, LLP

(57) ABSTRACT

Cooling apparatus and releasing system for beverages in containers, by which beverages in containers may be withdrew from the refrigeration with no need to open the front door, having wired vertical devices inside the refrigerated apparatus set, wired devices being able to comprise beverage cans, which are released for consumption through a by-hand operating lever, being conducted by gravity to a front tray, inferior and horizontal; the beverage in containers is kept entirely cooled all the time, not having thermal exchange between the refrigerator inside and the environment because there is not an accessing door with wide opening, which brings high electrical energy saves for the location, as well as minor maintenance services of the apparatus and of the compressor.

4 Claims, 3 Drawing Sheets

COOLING APPARATUS AND RELEASING SYSTEM FOR BEVERAGES IN CONTAINERS

This present invention relates to a cooling apparatus and to a releasing system for beverages in containers, preferably in aluminum cans, whereby the said cooling apparatus provides a system for releasing beverage cans without opening the door, turning the same available for consumption through a by-hand operating lever.

The most conventional apparatus for cooling beverages in general is the traditional refrigerator, known by being assembled in a quadrangle set, internally cooled, and having a front door,which allows accessing its internal side.

All the pubs, restaurants, snack bars and the like do have conventional refrigerators for storing, preserving and cooling beverages cans and bottles in general.

During all public consumption actions in such locations, and due to the frequent beverage requests, the refrigerators doors are opened and closed so many times that it becomes necessary to keep the internal temperature graduated to the most lower level, wasting much more electric energy and wearing out the apparatus. According to conducted researches, each time the refrigerator door is opened, there is the thermal exchange between the internal temperature of the refrigerator set and the environment temperature (external environment), which brings a natural warm-up trend for the internal refrigerator set air, being detrimental for the ideal temperature of the goods or beverages.

In accordance with the above description, it is easy to conclude that a location which has high beverage consumption must be aware of keeping cans and bottles temperature and, at the same time, must concern about the electric energy expenditures and with the refrigerator wearing out process, since the door is opened and closed successively.

The object of the present invention is to provide a cooling apparatus and releasing system for beverages in containers, which makes unnecessary the front door access. This keeps the cans aligned in a vertical wired device, assembled into the cooled refrigerator set, and it is only required to press the inferior frontal lever, corresponding to the wired device, in order to get the cans by hand. Once the lever is lowered, the articulated door is moved, releasing the can or bottle that is prompted in the inferior basis of the referred device, can which immediately falls in an inferior tray. In such an instant, the lever simultaneously gets back to its resting position through the returning to spring, put in the ways the next can or bottle, which stands available for a new lever pressing.

In this way, it is noted that the beverage in a container keeps entirely cooled during all the time, not existing thermal exchange between the refrigerator inside and the environment, once an accessing door simply does not exist, with a wide opening, in this invention, which provides large saves of electric energy for the location, besides of providing a less frequent apparatus and compressor maintenance service.

The present refrigerator and releasing system brings a frontal electronic display, which allows looking at and controlling the internal temperature of the refrigerator set, which additionally can have a counting sensor advising whenever more beverages must be supplied with in the wired devices.

The present utility model will be better described as follow, for a wide comprehension, making references to the attached drawings, in which.

Figure 1:
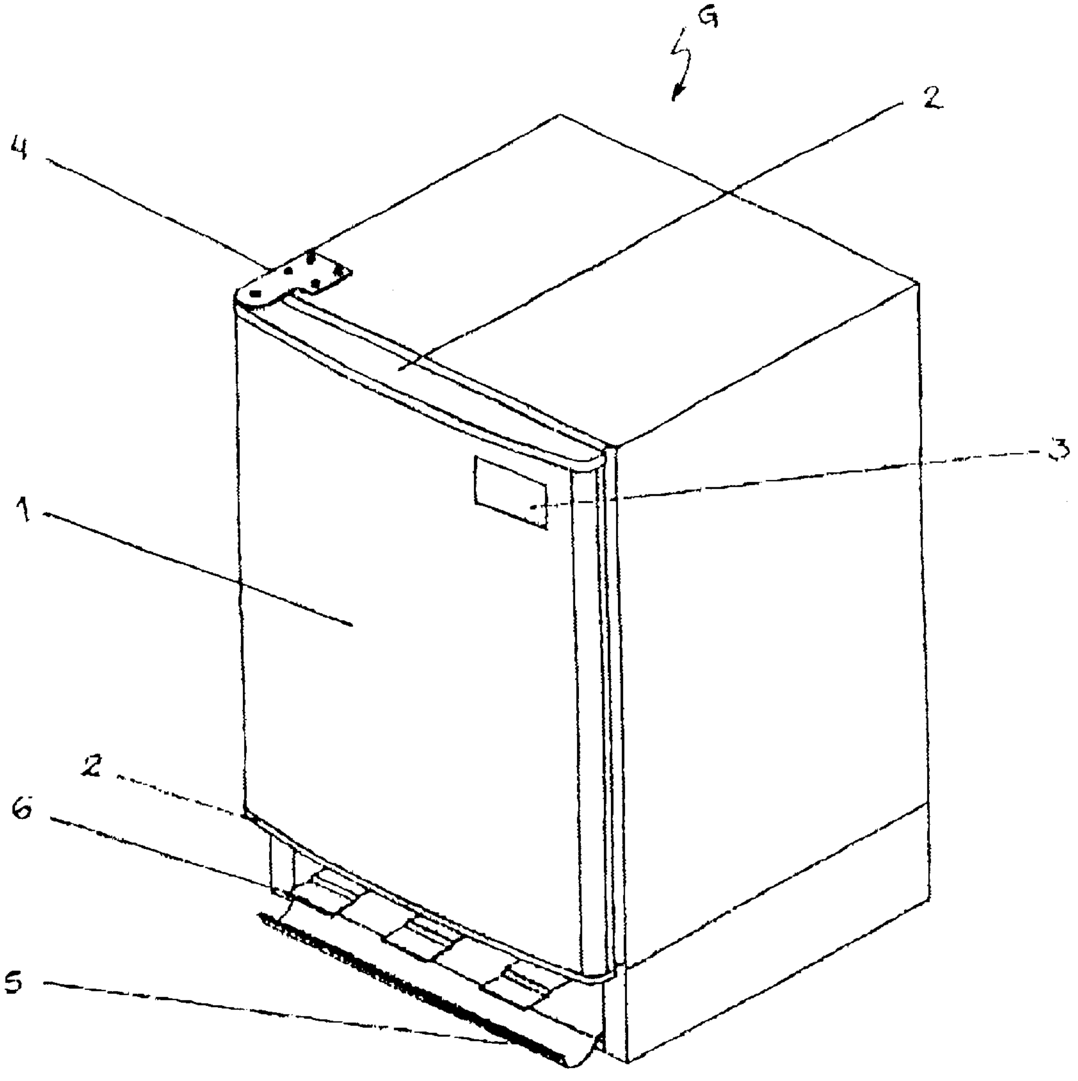
FIG. 1 is a perspective view of the refrigerator and releasing system of this invention.

With regards to the attached drawings, the privileged object relates to cooling apparatus and releasing system for beverages in containers, comprised by an apparatus set (G) which Is assembles in a rectangular shape with steel sides thermally insulated by injected polyurethane, having in the front a door (1) made by steel sheet insulated by injected polyurethane, finally touched by plastic (2) on the top and the bottom, containing an electronic digital display (3), being held in position by two hinges (4), and having at least one lever (6) on the bottom side, which, through a hand operation, releases an unit of beverage in container each time, preferably cans (L) which, in its turn, falls down on a front tray, inferior and horizontal (5), the referred can in position to be taken and consumed.

The apparatus set inside (G) owns a storage system A) the beverage cans (L), system which is assembled by at least one wired vertical device (7) which supports a cans series (L), the said cans being inserted through the door (1) by means of the front top access (8) and in the horizontal position.

The wired system (7) is inserted in the apparatus set inside (C), being fastened by superior and inferior press coupling (9), in order to allow withdrawing and Installing it with no tool use, if the apparatus set needs to be cleaned and maintained.

The wired system (7) owns shapes and dimensions designed for an improved use of the apparatus set inside space. The cooling of the beverage cans is obtained by an airflow, which is refrigerated while passing the vaporizer (10), induced by a micro fan.

Figure 2:
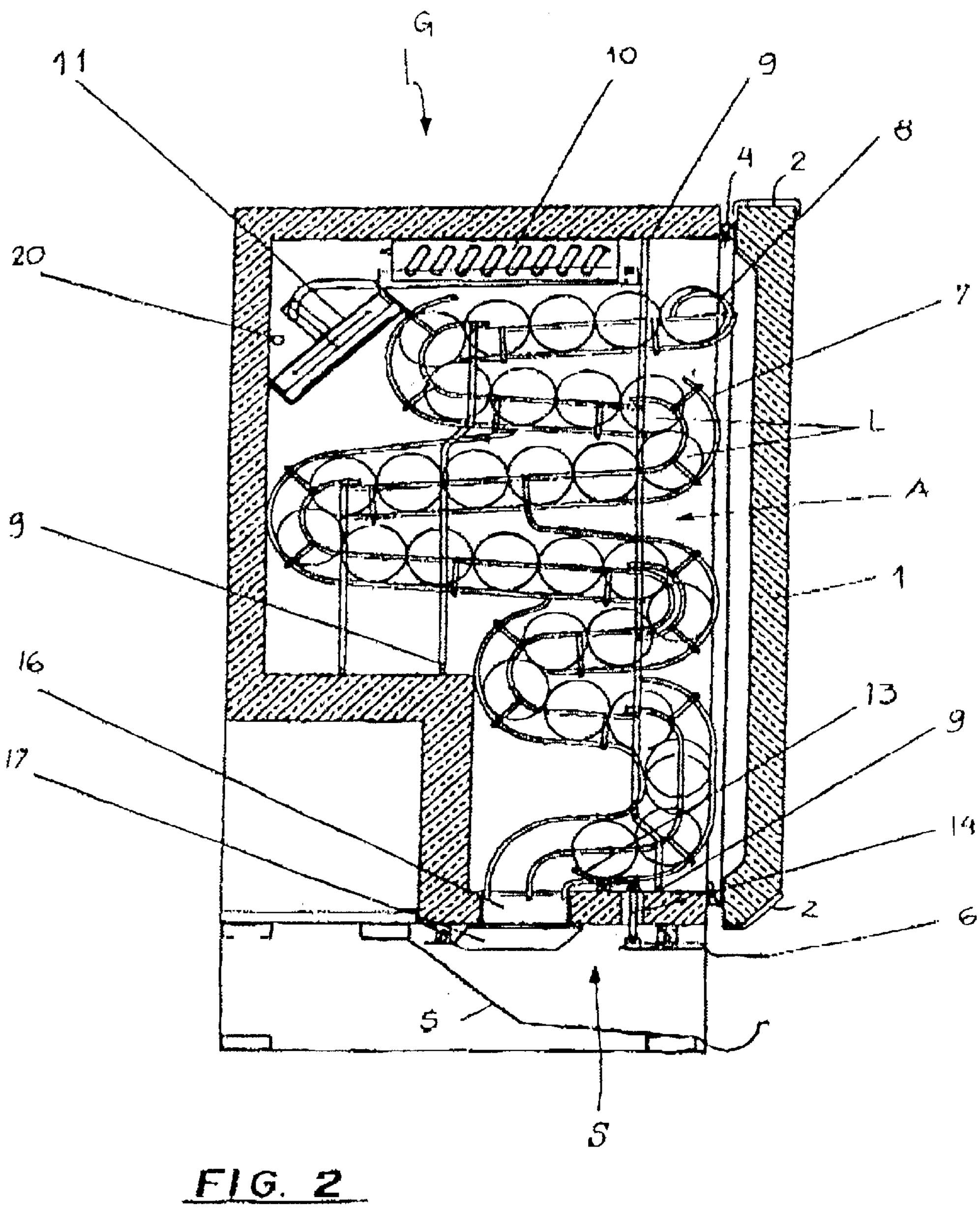
FIG. 2 is a side view with a transversal section.
Figure 3:
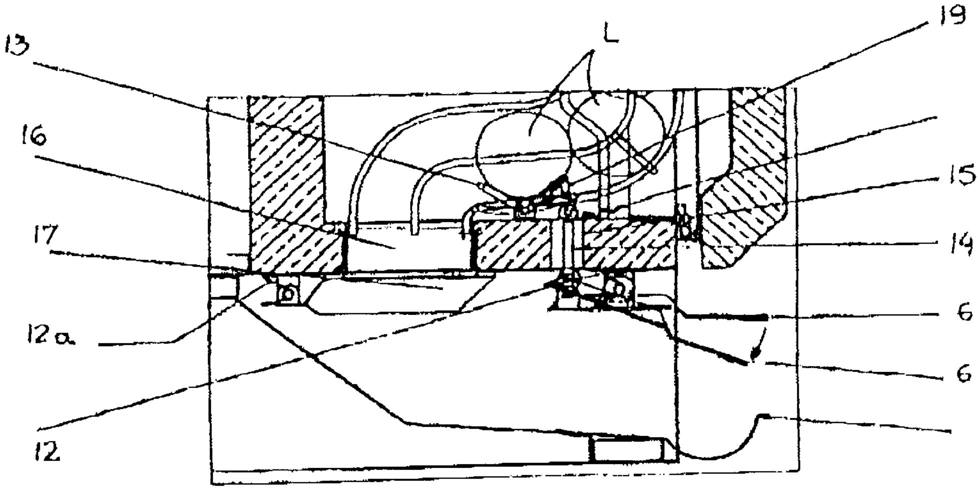
FIG. 3 is an enlarged detail of the inferior basis of the proposed apparatus, illustrating the lever system for getting the beverage.

The releasing system (S) (see FIG. 2 and detail in FIG. 3) is formed by a lever (6) alike device, with a distorting string (12) connected to a lock/holder (13) of cans (L), lever (6) which, when operated, moves a vertical bolt (14) in the corresponding hole (15), thereby moving the holder (13), releasing the can (L) to a inferior and rectangular hollow (16), which is kept closed by an inferior articulated door (17), whose returning is provided by a distorting string **(12*a*)**.

Figure 4:
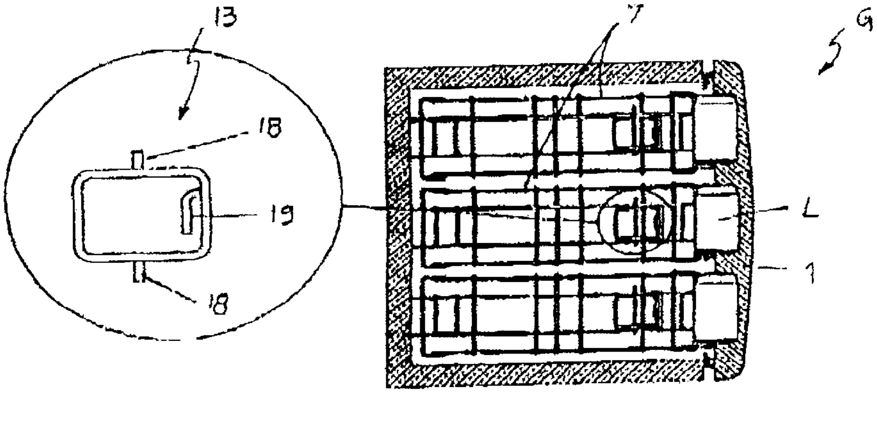
FIG. 4 is a detail of the lock/holder which releases or put the beverage into a position to be withdrew.

The lock/holder (13), which is fasted to the apparatus set through two semi-axis (18) (FIG. 4), and which owns a bolt (19), which works as a movement device and limiting action for the rise of the operating vertical bolt (14).

At the time the outside lever (6) is operated by hand, the vertical bolt (14) rises in the hole opening (15), which makes the bolt (19) turns the lock (13) in the semi-axis (18), pushing the can (L) there stored in the direction of the rectangular hollow (16), inducing the opening of the inferior door (17), as simultaneously avoids the subsequent cans (L) movements.

As returns to its original position through the distorting string (12), the lever (6) moves the lock/holder (13) and allows other can to move (L), positioning it to the next lever operation.

The inferior door (17) owns a thermal insulation in both sides and allows the can (L) to pass down by gravity, which return to the closed position 15 through the distorting string **(12*a*)**.

The electronic digital display (3) is connected to an electronic thermometer (20) though a coaxial cable passing by internal tube to the front door, with connection by the inferior edge, near the hinge.

The thermometer sensor (20) is placed in the air return, before the vaporizer, so that the can temperature is indicated.

The operating control of the compressor (not illustrated) is done by a mechanical thermostat, placed in the apparatus set inside. The condenser unit is placed in the back inferior side of the apparatus set and owns: compressor, condenser, fan and the other common accessories of the cooling 25 cycle.

In spite of the detailed invention, it is important to understand that the same does not limit its application to the details and phases herewith described. The invention is able to be assembled in other ways and to be put into practice and execution by a variety of ways. It must be understood that the terminology herewith adopted aims only to describe, not to limit.

What is claimed is:

1. Cooling apparatus and releasing system for beverages in containers, comprising an apparatus set which owns a rectangular shape with steel sides thermally insulated by injected polyurethane, having a front door made by steel sheet with insulation by injected polyurethane, finally touched by plastic on the top and the bottom, being held in position by two hinges and containing a electronic digital display and counting sensor, characterized by the apparatus set inside having storage system and releasing system for the beverages in containers, showing in the inferior side at least one lever, operated by-hand, whose function is releasing a beverage unit each time, through the lock/holder the beverage which is conducted to a front tray, inferior and horizontal.

2. Cooling apparatus and releasing system for beverages in containers, in accordance with claim 1, characterized by the storage system being constituted by at least one wired vertical device which comprises a can series put in the front upper side and in the horizontal position; the wired device is inserted in the apparatus set inside and is fastened by superior and inferior press coupling.

3. Cooling apparatus and releasing system for beverages in containers, in accordance with claim 1, characterized by the releasing system being constituted by a lever alike device with distorting string connected to the lock/holder lever which, when operated, moves a vertical bolt in a corresponding hole, thereby moving the holder through bolt, which releases the can to a inferior and rectangular hollow, which is kept closed by an inferior articulated door, whose returning is provided by a distorting string.

4. Cooling apparatus and releasing system for beverages in containers, in accordance with claim 3, characterized by the lock/holder being fastened to the wired device through two semi-axis having bolt which works as a movement device and limiting action for the rise of the operating vertical bolt.

* * * * *